United States Patent

[11] 3,589,496

[72] Inventor John M. Leach
 P.O. Box 341, Port Jefferson, N.Y. 11777
[21] Appl. No. 799,366
[22] Filed Feb. 14, 1969
[45] Patented June 29, 1971

[54] ARTICLE ACCUMULATION CONVEYORS
 11 Claims, 5 Drawing Figs.
[52] U.S. Cl..................................................... 198/34,
 198/37, 198/127 R
[51] Int. Cl....................................................... B65g 13/07
[50] Field of Search.......................................... 198/127,
 34, 37

[56] References Cited
UNITED STATES PATENTS
| | | | |
|---|---|---|---|
| 3,266,617 | 8/1966 | Forsyth et al................. | 198/127 |
| 3,400,806 | 9/1968 | Leach........................... | 198/127 |
| 3,420,356 | 1/1969 | DeGood....................... | 198/127 |

Primary Examiner—Robert G. Sheridan

ABSTRACT: This invention relates to an article handling conveyor of the accumulation-type which means that whenever an article is stopped from movement thereon, the article following is automatically also stopped at a point where it can not exert any sizeable force against the first stopped article and this action is repeated as additional articles approach stopped articles ahead.

This makes it impossible for the articles to damage each other because of the lack of pressure exerted from one to the other and also prevents pressure from building up as the line of articles lengthens. It also make it possible to remove an article from the line without a struggle.

The power source is a constantly moving beltlike member or band from which power is taken off to move the articles and released to stop the articles. The power takeoff and release mechanism is characterized by its ability to operate without ever disturbing the position of the band laterally of its normal path of movement which reduces wear on the band, enables it to run smoothly, reduces noise, and does not disturb the tracking of the band.

PATENTED JUN29 1971 3,589,496
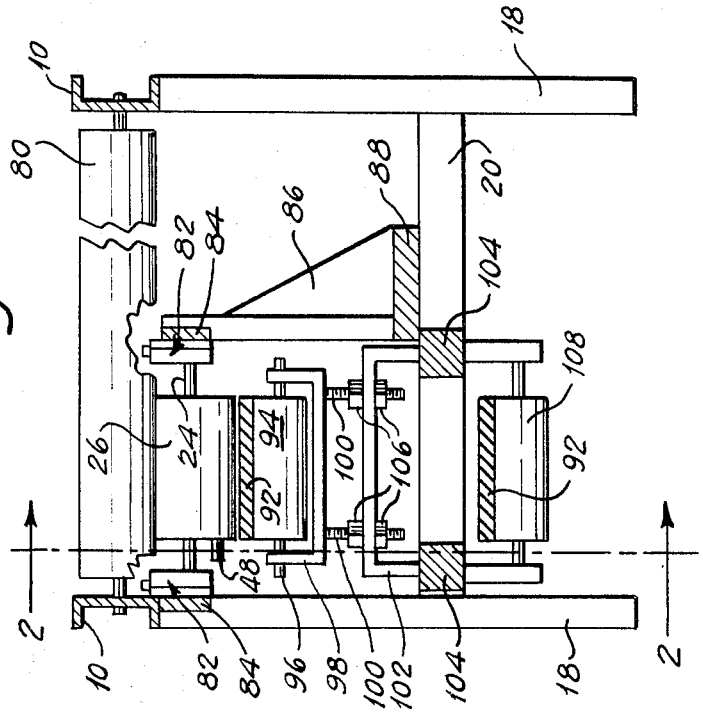
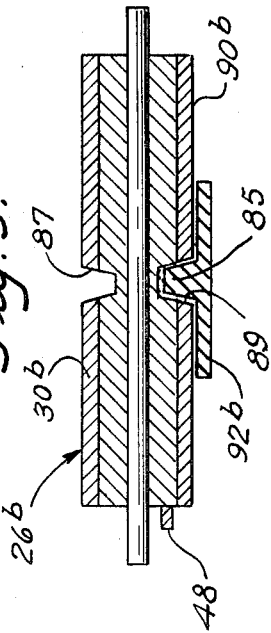
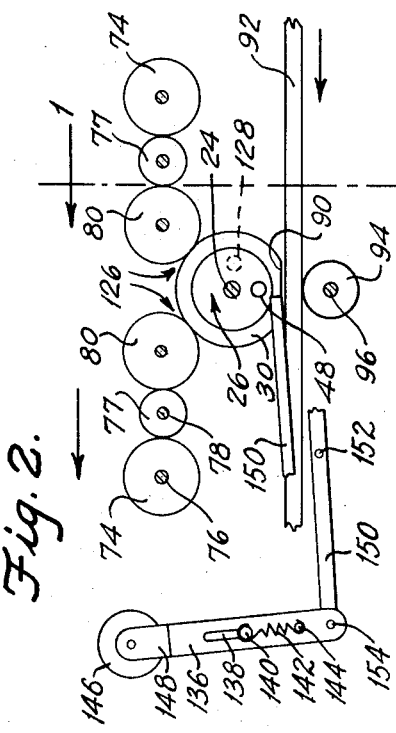
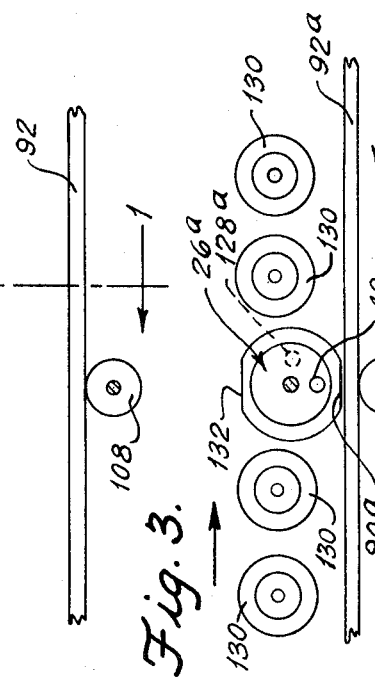
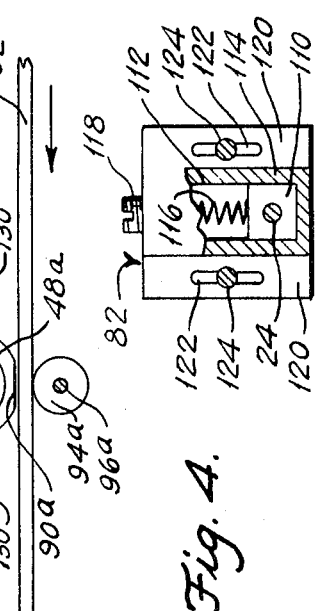
INVENTOR.
John M. Leach

ARTICLE ACCUMULATION CONVEYORS

In most of the so-called "Zero Pressure" accumulation conveyors available today, the movement and stoppage of articles has been effected by raising the driving belt either into contact with the articles themselves or into contact with rollers carrying the articles to move the articles and dropping the belt away to stop the articles. This bodily movement of the belt has made it difficult to keep trained, has been noisy and has increased wear excessively.

It is the main object of the present invention to provide an accumulation conveyor in which the driving band is never even slightly deflected from its normal path of movement during accumulation operations.

Other objects and advantages of the present invention will become apparent to those skilled in the art upon recourse to the following specification and drawing, in which:

FIG. 1 is a cross-sectional view of a roller-type accumulation conveyor made in accordance with the present invention and taken substantially on the plane indicated by line 1-1 of FIG. 2 and looking in the direction of the arrows;

FIG. 2 is a skeletonized cross-sectional view taken substantially on the plane indicated by line 2-2 of FIG. 1 and looking in the direction of the arrows;

FIG. 3 is a view corresponding to FIG. 2 but showing a skate wheel-type accumulation conveyor made in accordance with the present invention;

FIG. 4 is an enlarged detail view of a bearing mounting for the shaft 24 of the cylinderlike motion transmitting member 26, and FIG. 5 is a central, vertical, cross-sectional view of a modified form of drive made in accordance with the present invention.

What is now considered the preferred embodiment of the present invention comprises an accumulation conveyor having a frame formed of two side members 10 suitably supported at desired intervals by legs 18 in pairs which are tied together by crossmembers 20.

Rollers 74 suitably journaled on through shafts 76 end mounted in the members 10 provide rotatable article supporting and moving elements positioned along the frame to form a track for the articles to be conveyed. The rollers 74 are interdriven by friction wheels 77 each mounted on a shaft suitably carried by the frame members 10. As many such interdrives may be provided as desired. The friction wheels are preferably formed of some suitable slightly compressible material in order to drive without slippage.

Each two groups of interdriven rollers 74 are simultaneously driven by a cylinderlike friction member 26 provided with a tread cover 30 and carried by a shaft 24 suitably journaled in bearing assemblies 82 fastened to stringers 84 carried by legs 18 and a member 10 and a bracket 86 carried by a stringer 88 carried by the crossmembers 20. The tread 30 contacts the end rollers 80 of each group of rollers 74. For the purpose of explanation, only two rollers 74—80 have been shown in a group but more can be used as desired. It will be understood that the cylinderlike friction drive members 26 and the rollers driven thereby will be placed repeatedly along a frame to form the length of track desired.

The cylinderlike member 26 is provided with a stud 48 protruding from one end. This stud 48 is adapted to cooperate with an article operated mechanism which will move an element into position when desired to block movement of the stud 48 and thus stop member 26 from rotating. This mechanism can be of the types shown by U.S. Pat. No. 3,400,806; U.S. application Ser. No. 765,250, filed Oct. 4, 1968; U.S. application Ser. No. 790,239, filed Jan. 10, 1969, and many other mechanical linkage types as well as pneumatic or hydraulic types.

As an example, an article operated sensor like those disclosed in U.S. application Ser. No. 765,250 will be disclosed. As shown in this application the article supporting and moving rollers in the present application rollers 74—80, are disposed along the conveyor in groups separated by spaces in which the sensors are located. Each sensor comprises an arm 136 suitably mounted for slight vertical movement as by being provided with a slot 138 through which a headed stud 140 extends and is carried by the conveyor frame. A tension-type coil spring 142 is connected at its upper end to the stud 140 and at its lower end to a projection 144 on the arm 136 which causes the arm 136 to be resiliently held with the stud 140 at the bottom of the slot 138 but capable of being moved downwardly by contact with an article moving along the conveyor. Article contacting members may take the form of one or more wheels 146 rotatably mounted in a bifurcated section 148 suitably attached to the top of arm 136. A roller can if desired be used in place of one or more of the wheels 146.

Each arm 136 is suitably pivoted at 154 to an arm 150 which is pivoted as at 152 to the conveyor frame. The free end of the arm 150 when no article is resting on a wheel 146 is positioned just below the path of movement of the stud 48. When an article contacts a wheel 146 the arm 136 which carries it is moved downwardly against the action of the spring 142 carried by that arm 136 and moves the free end of the arm 150 up into position where the stud 48 contacts it and stops rotation of the cylinderlike member 26 which carries the stud 48 which in turn stops rotation of the rollers 80 driven by that cylinderlike member and their associated rollers 74 which prevents these particular rollers from further moving any article resting on them.

It will be understood that the arm 136 shown in FIG. 2 has been moved closer to the cylinderlike member 26 which it controls which accounts for the break shown in the arm 150. Actually the arm 136 shown in FIG. 2 is positioned in the space just ahead of the group of rollers 74—80 which are positioned just ahead of the group of rollers 74—80 shown in FIG. 2 in order to correspond exactly with the structure in U.S. application Ser. No. 765,250.

The thread 30 of the cylinderlike member 26 is provided with a flattened area 90 on its periphery which extends axially all along the length of the member 26. When the stud 48 is stopped it will always be in a position so that the flattened area 90 is facing downward as shown.

A roller 94 carried by a shaft 96 is positioned under each member 26. Each shaft 96 is suitably journaled in a U-frame 98 provided with threaded studs 100 which are adjustably connected to an inverted U-frame 102 by nuts 106. The frames 102 are carried by stringers 104 extending between the crosspieces 20. The elevation of the roller 94 can be adjusted by raising or lowering the U-frame 98 by means of the nuts 106.

A flat belt 92 extends between the cylinderlike members 26 and the rollers 94 and is supported at each end by a tail pulley and a head pulley suitably driven by an electric motor or other prime mover drive. The pulleys and drive are conventional and have been omitted from the drawings to conserve space. The return run of the belt will be supported at desired intervals by return idlers 108.

Each of the shafts 24 of the cylinderlike members 26 are journaled at each end in a vertically adjustable bearing assembly shown in detail in FIG. 4. Each assembly 82 comprises a suitable bearing block 110 which receives one end of a shaft 24 and is slidable vertically in a way 112 formed in a casing 114. A compression spring 116 is interposed between the top of the block 110 and an adjustment screw extending into the top of the block shown at 118. The casing 114 is provided with side wings 120 each of which is provided with a slot 122 through which screws or bolts 124 are passed to fasten the assemblies 82 in adjusted position on the stringers 84. It will be noted that the springs 116 when unopposed hold the bearing blocks 110 in their lowermost position in the casings 114.

With the elements in the positions shown in FIG. 2 with the top or working run of the belt 92 moving in the direction of the bottom arrow, the articles will be driven by the rollers 74—80 in the direction of the top arrow. Under such conditions, the mechanism employed to stop the movement of cylinderlike member 26 must contact the left-hand side of the stud 48.

The operational adjustments consist of loosening the fasteners 124 and adjusting the elevation of the cylinderlike members 26 so that when in the position shown in FIG. 2, the tread of each is just barely out of contact with the rollers 80. At that time the springs 116 maintain the bearing blocks 110 in their lowermost positions. Each roller 94 is then adjusted by moving nuts 106 so that the belt 92 just barely misses contact with the flattened area 90 of tread 30.

With this adjustment, the belt 92 when stud 48 is blocked from movement during an accumulation function is free to move between the flattened area 90 and roller 94 while rotating the roller 94 and the belt receives no load from the stopped member 26. Also, the rollers 74—80 are free to rotate because they are not contacting the adjacent tread 30. This is desirable when it is desired that the articles carried by rollers 74—80 can coast after stoppage of the member 26 so as to fill up spaces between them. It is further desirable because when the blockage of stud 48 is removed, the member 26 can be rotated by a weight 128 such as a lead rod embedded at the point shown in FIG. 2 in the member 26 the very small amount before the belt 92 will pick up the rounded off trailing edge of the flattened area 90 of the member 26 and start rotation of the member 26 positively. At the same instant passage of the flattened area 90 out of the space between the member 26 and the roller 94 will cause greater thickness of the tread 30 where it is not flattened to slightly raise the entire member 26 against the action of the springs 116 and force the tread at the points 126 into tight driving contact with the rollers 80 and thereby rotate them to move any article on them along the track.

When it is desired that the articles not be free to coast on the track, as while accumulating on an incline or decline, the bearing assemblies will be initially adjusted so that light contact remains between member 26 and rollers 74—80 when stoppage of the member 26 occurs so that the rollers 74—80 are locked from rotation also. In this case the roller 94 will be adjusted upwardly until the belt 92 lightly contacts the flattened area 90 of member 26 so as to start rotation of member 26 as soon as the blockage of stud 48 is removed. In this case, each flattened area 90 will exert a very light and negligible load on the belt 92.

In addition to the above function of springs 116 they also create a load tending to force the member 26 into tight driving contact with the belt 92 which is in addition to the load created by the rollers 74—80 bearing down on the member 26. This is very important when the rollers 74—80 are not restrained from upward movement, such, for example, when the rollers 74—80 are of the safety "pop-out" type.

An application of the present invention to a skate wheel-type of accumulation conveyor is shown in FIG. 3. In this application the elements 26a, 48a, 90a, 92a, 94a, 96a, and 128a all serve corresponding purposes and functions as in the roller-type but the rollers 74—80 are replaced by skate wheels 130 and the cylinderlike member 26a instead of rotating rollers directly contacts the bottoms of the articles and thus moves them along the track formed by the wheels 130. The wheels 130 can be replaced by rollers like 74 when desired.

In this application, when it is desired that the cartons or articles of other types be able to coast while a member 26a is stopped, a second flattened area is provided on the tread of member 26a as shown at 132. This area is formed so that when the member 26a is stopped, the area 132 will either just contact or just miss contact with the bottoms of the articles so that they can coast over the stopped member 26a.

The initial adjustment of this skate wheel unit is essentially the same as for the other unit.

In FIG. 5 a special belt is shown which is especially applicable to heavy duty applications where the belt pull will be much higher than in light or medium duty applications. This belt comprises a flat section 92b which is substantially the same as belt 92 but 92b has a V-belt 85 either attached or built into it. A groove 87 is formed in the cylinderlike member 26b which receives the v-belt section 87 so that belt 92b functions both as a flat belt and a V-belt.

The member 26b is provided with a flattened area 90b as before which functions in the same way as before and the groove 87 is widened out as the flatted area 90b as shown at 89 so that the V-belt section 85 will not drive in the groove over the area which is widened 89. Otherwise the operation of the special belt is the same as before.

When the special belt 92b is used the cylinderlike member 26b will usually be made considerably longer than when a belt like 92 is used in order to supply more drive contact with the rollers 80 to enable them to move the heavier duty loads.

It will be noted that although very slight spaces may exist at points 126 between the members 26 and the rollers 80 and at the flattened area 92 between the member 26 and the belt 92 as well as at 132 between the members 26 and the articles being conveyed so that complete physical connection may not exist at these points, the various members are always permanently operatively connected at these points because immediately upon the members 26 starting to rotate the driving action at these points also starts and it is not necessary to consume time to move any element from one definite position to another before the articles can start to move. This accumulation of time saved becomes a big factor when thousands of articles are being moved. This is another advantage of being able to avoid moving the driving belt up and down.

Although the flat belt 92 is preferred, other beltlike bands such as cables and the like can be used where desired.

The flattened area 90 passes the rollers 80 too rapidly to have any significant affect on the driving of these rollers. The same applies to the flattened areas 90a and 132 on the member 26a relative to driving the articles.

The accumulation function of the conveyor of the present invention in either given direction of operation will be exactly as disclosed in U.S. application Ser. No. 765,250.

The foregoing is to be considered as descriptive and not limitative because many changes and modifications can be made in the physical structure without departing from the spirit of the invention.

The invention having been described, what I claim is:

1. An article accumulation conveyor comprising a frame, rotatable article supports forming a track carried by said frame, a power driven flat belt movable along but vertically spaced from said article supports, supports under said belt maintaining it at substantially fixed elevation, means for transmitting movement from said flat belt to said articles comprising cylinderlike members mounted for rotation in position to frictionally contact and rotate at least some of said rotatable supports and extending into the space which is between said rotatable article supports and said flat belt and rotatably driven by said flat belt, each of said cylinderlike members being provided with an axially extending flat area on its periphery, and means operated by an article when in a selected position to stop at least one of said cylinderlike members from rotating when its flat area is adjacent to said flat belt whereby said flat belt can pass under said flat area without exerting any appreciable rotational force on said stopped cylinderlike member.

2. An article accumulation conveyor as specified in claim 1 in which the rotatable article supports are rollers.

3. An article accumulation conveyor as specified in claim 2 in which said flat belt has a V-belt connected with it on the side which drives the cylinderlike member and said cylinderlike member is provided with a groove to receive said V-belt so as to provide an additional driving force to said cylinderlike member.

4. An article accumulation conveyor as specified in claim 2 in which said cylinderlike members are made sufficiently long to provide sufficient driving contact with said rollers to transmit substantially all of the driving force of said cylinderlike members to said rollers.

5. An article accumulation conveyor as specified in claim 1 in which the cylinderlike members are spring biased towards the flat belt.

6. An article accumulation conveyor as specified in claim 5 in which the rotatable article supports are rollers.

7. An article accumulation conveyor as specified in claim 1 further characterized in that unyielding supports are provided under the run of the flat belt which rotatably drives said cylinderlike member.

8. An article accumulation conveyor comprising a frame, rotatable article supports forming a track carried by said frame, a power driven flat belt movable adjacent to said article supports, supports under said belt maintaining it at substantially fixed elevation, means for transmitting movement from said flat belt to said articles comprising cylinderlike members mounted for rotation in position to contact and move said articles and rotatably driven by said flat belt, each of said cylinderlike members being provided with an axially extending flat area on its periphery, and means operated by an article when in a selected position to stop at least one of said cylinderlike members from rotating when its flat area is adjacent to said flat belt whereby said flat belt can pass under said flat area without exerting any appreciable rotational force on said stopped cylinderlike member.

9. An article accumulation conveyor as specified in claim 8 in which said cylinderlike member has a second axially extending flat area on its periphery diametrically positioned relative to said first named flat area.

10. An article accumulation conveyor comprising means for supporting and moving articles therealong, said means including cylinderlike members having a flat area on the periphery thereof, a flat power driven belt extending below said cylinderlike members, means supporting said belt at a permanent elevation at which said belt will contact and rotate said cylinderlike members and thus move said articles, and means operated by an article when in selected position to stop at least one of said cylinderlike members from rotating when its flat area is adjacent to said flat belt whereby said flat belt can pass under said flat area without exerting any appreciable rotational force on said stopped cylinderlike member.

11. An article accumulation conveyor as specified in claim 8 in which the rotatable article supports are skate wheels.